Dec. 29, 1970  F. SHAW ET AL  3,551,784

ALTERNATING CURRENT GENERATORS HAVING PLURAL OUTPUT WINDINGS

Filed July 22, 1968  3 Sheets-Sheet 1

INVENTOR
Fred Shaw & Eddie Wharton
BY Glascock, Downing
& Seebold
ATTORNEY

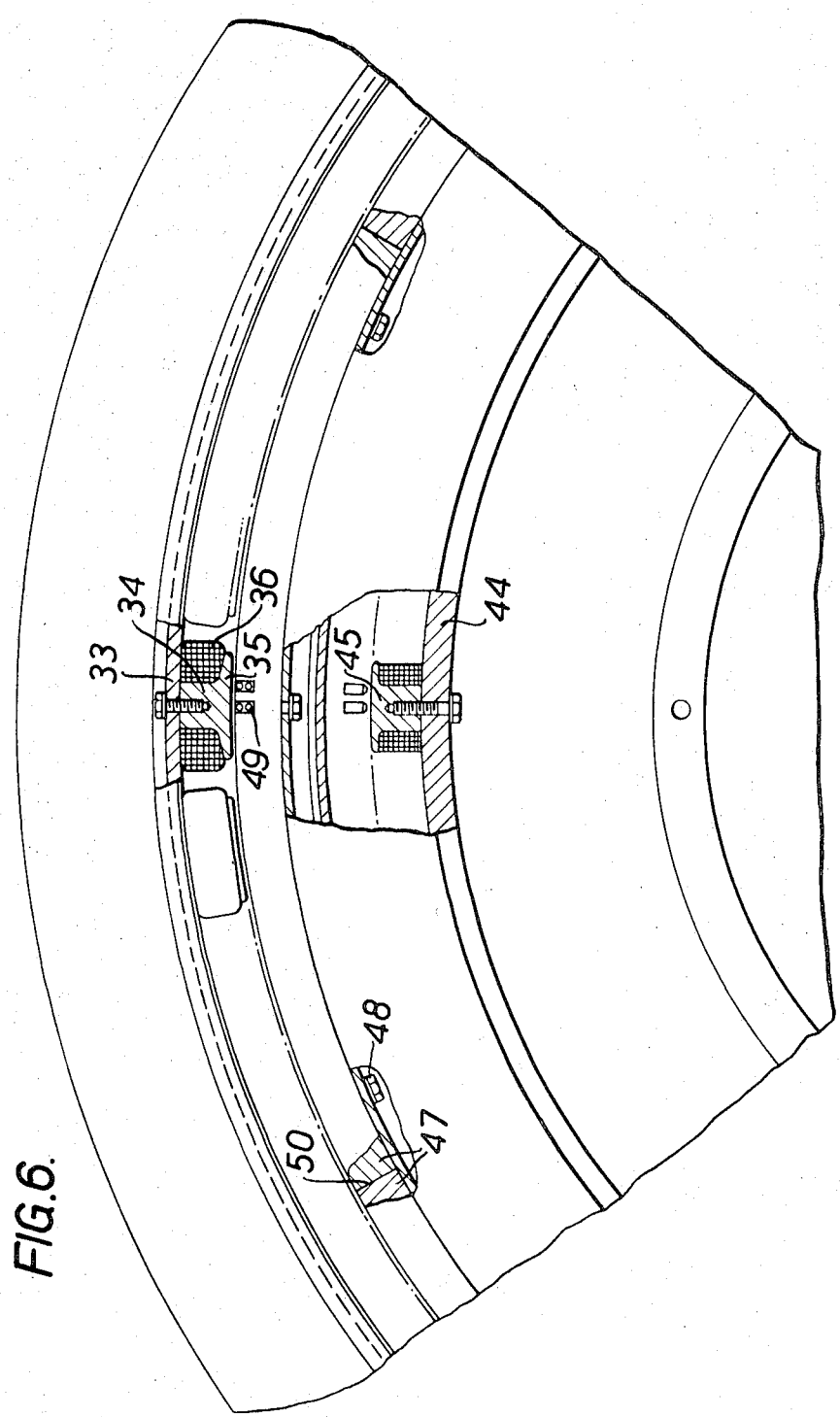

United States Patent Office 3,551,784
Patented Dec. 29, 1970

3,551,784
ALTERNATING CURRENT GENERATORS HAVING PLURAL OUTPUT WINDINGS
Fred Shaw, North Wembley, and Eddie Wharton, Beaconsfield, England, assignors to Rotax Limited, London, England, a British company
Filed July 22, 1968, Ser. No. 746,634
Claims priority, application Great Britain, July 24, 1967, 33,492/67
Int. Cl. H02p 9/00; H02k 19/34
U.S. Cl. 322—90                                          1 Claim

ABSTRACT OF THE DISCLOSURE

An alternating current generator including a stator structure having a casing and a plurality of arcuate stator sections each of which carries an output winding whereby a plurality of outputs can be obtained which are electrically isolated from each other.

---

This invention relates to alternating current generators of the kind having an annular first structure which carries the output windings of the generator and a second structure carrying magnetic pole pieces, the two structures being movable angularly relative to each other to produce an electrical output.

In a conventional generator of this type the output winding extend all the way round the stator structure and this applies if a single phase output or a multi-phase output is required. Where a plurality of loads having differing power factors both leading and lagging are supplied with current from such a generator the waveform of the generated voltage may suffer. A further difficulty arises where the loads need to be electrically isolated from each other. The object of the invention is to provide a generator of the aforesaid kind in which the difficulties outlined above are overcome in a simple and convenient manner.

According to the invention in a generator of the kind specified the annular structure carrying the output windings is divided into a plurality of arcuate sections each section carrying a complete output winding or windings whereby a plurality of electrically isolated supplies can be obtained from a single generator.

In the accompanying drawings:

FIG. 6 is an end view of the generator of FIG. 5 with parts removed for the sake of clarity.

Referring to FIGS. 1–4 there is shown an annular stator structure 10 for an alternating current generator and mounted within the stator structure although not shown, is a rotor structure. The rotor structure includes a shaft upon which is mounted a laminated core which defines pole pieces extending towards the internal periphery of the stator structure. The pole pieces terminate in pole heads which in use, are polarized so that adjacent pole heads are of opposite magnetic polarity by means of for example windings surrounding the pole pieces respectively.

Figure 1:
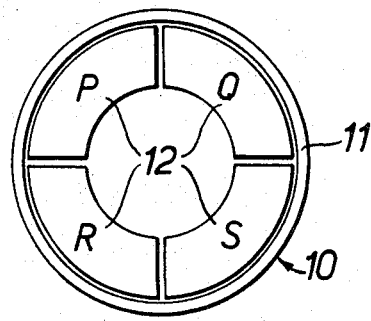
FIG. 1 is an end view of a stator structure of one example of a generator in accordance with the invention.

The stator structure includes a casing 11 constituting part of the housing of the generator and secured within the casing are four arcuate stator sections 12. Each section is axially slotted in known manner and is built up as a stack of laminations. Each stator section 12 carries its own output windings and these may be wound in the slots so as to give a single phase output or a multi-phase output as required. In this manner from a single machine four outputs are obtained which is electrically isolated from each other. In the example of FIG. 1 the arcuate length of the stator sections 12 is equal and a small air gap separates adjacent sections. If desired depending on the output required the sections may be of differing arcuate lengths but may still extend through 360°.

Figure 2:
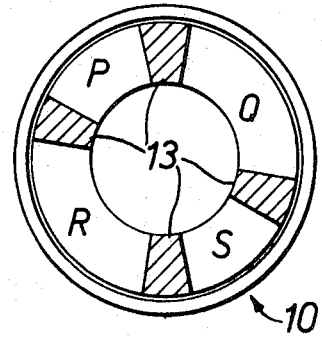
FIG. 2 is a similar view to FIG. 1 showing another example of a generator.

In FIG. 2 a stator structure is shown in which the arcuate length of the sections differs and furthermore the sections do not subtend an angle of approximately 360°. The resultant gaps between the adjacent sections are filled with passive sections 13 formed from suitable non-magnetic material. The gaps may be equal or unequal as desired and in the latter case the degree of inequality may be adjusted to compensate for the power factor of the load.

Figure 3:
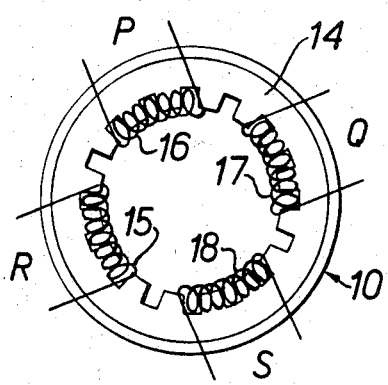
FIG. 3 is a view similar to FIG. 1 showing a further example of a generator.
Figure 4:
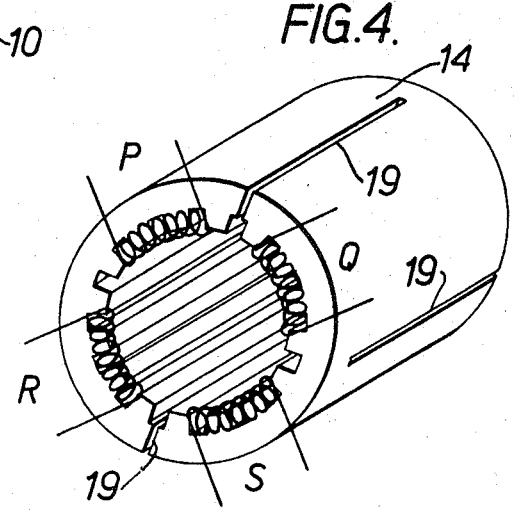
FIG. 4 is a perspective view showing a modification to part of the example of FIG. 3

In FIG. 3 the stator sections form part of a continuous stator ring 14. The windings which are diagrammatically shown at 15, 16, 17 and 18 are disposed in slots but the separation of the sections is obtained by leaving at least one empty slot between each section. In FIG. 4 which shows a modification of FIG. 3 axial slits 19 are formed in the stator ring 14 between each section and the slits serve to enhance the magnetic separation between the stator sections. In order to enhance the magnetic separation the slits extend from opposite ends of the stator ring 14.

Figure 5:
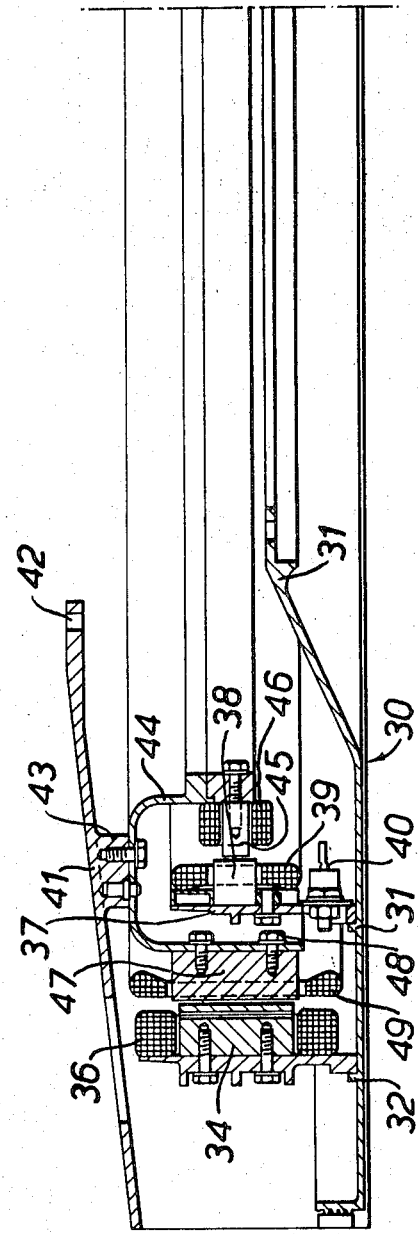
FIG. 5 is a section through a practical form of a generator in accordance with the invention.

Referring now to FIGS. 5 and 6 there is shown a generator designed for use with a gas turbine engine and adapted to be mounted thereon. The rotary part of the generator is coupled directly to the rotary part of the engine and comprises an annular disc like member 30 which is dished towards its internal periphery and which at its internal periphery is provided with a boss portion 31 whereby it can be secured to the rotary part (not shown) of the engine. Formed on the flat portion of the member 30 are a pair of spaced circumferential ledges 31 and 32. Ledge 31 supports an annular plate 33 having a plurality of equi-angularly spaced pole pieces 34 having pole heads 35. The pole pieces are surrounded by energising windings 36 through which in use, a uni-directional current is passed the effect of which is to magnetically polarize the pole pieces in such a manner that adjacent pole heads are of opposite polarity.

The ledge 31 supports an annular plate 37 upon which is mounted an annular rotor structure 38 which is slotted on its internal periphery and which carries output windings 39. The electrical output from these windings is rectified by diode rectifiers 40 and is supplied to the energising windings 36.

Further provided is a dished and annular plate 41 which at its internal periphery is provided with a boss 42 whereby it can be secured to a fixed part of the gas turbine engine. Formed on the plate 41 is a circumferential boss 43 upon which is mounted an annular supporting member 44 having a generally U section. On the outwardly facing face of the inner limb are mounted a plurality of equi-angularly spaced pole pieces 45 surrounded respectively by windings 46 and terminating in pole heads 47 disposed adjacent to the rotor structure 38. In use, the windings 46 are supplied with uni-directional current from an external source and as relative rotation occurs alternating current is induced in the windings 39 and this is rectified and supplied to the windings 36. The pole pieces 45 together with the rotor structure 38 and the windings thereon constitute an exciter.

The outer face of the outer limb of the member 44 carries an annular stator structure which is composed of a plurality of arcuate stator sections 47 and these are secured to the outer limb of the member 44 by bolts 48. The outer face of each stator section is slotted and the slots accommodate output windings 49. Each stator section carries a complete winding or windings so that from each section a single or multi-phase output can be obtained which is electrically isolated from the output of its neighbor. The stator sections 47 are separated by small radial gaps 50 but separation of the sections can be obtained by any of the methods described earlier in the specification although the arrangement described is preferred since it facilitates assembly of the generator. The stator sections 47 in the arrangement described are of equal circumferential length although as explained earlier in the specification they may be of unequal length depending on the output required and they may be separated by passive sections.

Having thus described our invention what we claim as new and desire to secure by Letters Patent is:

1. An alternating current generator for use with a gas turbine engine and comprising a pair of spaced annular disc like members adapted to be mounted on fixed and rotary parts of the engine respectively, the member which is to be mounted on the fixed part of the engine having an annular member secured thereto having a substantially U section one of the limbs of said member supporting an annular stator structure carrying output windings, said stator structure being divided into a plurality of arcuate sections each section carrying a complete output winding or windings whereby a plurality of electrically isolated supplies can be obtained from the generator, a field structure carried by the other member whereby as relative rotation occurs between the disc members current will be induced in said output windings, diode rectifier means for supplying uni-directional current to said field structure, said diode rectifier means being carried by said other member, and an exciter for supplying alternating current to said diode rectifier means, the components of said exciter being carried by said disc like members respectively.

References Cited

UNITED STATES PATENTS

| | | | |
|---|---|---|---|
| 2,903,610 | 9/1959 | Bessiere | 310—254 |
| 3,029,378 | 4/1962 | Carlson | 322—90 |

ORIS L. RADER, Primary Examiner

H. HUBERFELD, Assistant Examiner

U.S. Cl. X.R.

310—198, 254